Patented Feb. 27, 1945

2,370,537

UNITED STATES PATENT OFFICE 2,370,537

MONOAZO DYESTUFFS

Basil Jason Heywood, Arthur Howard Knight, and Morvan Lapworth, Blackley, Manchester, England, assignors to Imperial Chemical Industries Limited, a corporation of Great Britain No Drawing. Application May 27, 1943, Serial No. 488,750. In Great Britain June 29, 1942

5 Claims. (Cl. 260—206)

The present invention relates to the manufacture of new water-soluble monoazo dyestuffs suitable for dyeing and printing acetate artificial silk, wool, silk, tin-weighted silk, and synthetic polyamide fibres such as, for example, nylon.

According to the invention we make the said dyestuffs by coupling a diazotised p-aminophenyl-hydroxyalkyl ether sulphuric ester (also called an aminophenyl sulphatoalkyl ether) which may carry substituents other than nuclear sulphonic, carboxyl, or acidylamino groups, with a phenol capable of coupling and substituted in the 4-position by a hydrocarbon residue containing at least two and not more than eight carbon atoms, which hydrocarbon residue is selected from the groups alkyl, aralkyl, cycloalkyl and aryl.

Also according to the invention we make the said dyestuffs by coupling a diazotised p-aminophenyl-hydroxyalkyl ether, which may carry substituents other than nuclear sulphonic, carboxyl or acidylamino groups, with a phenol capable of coupling and substituted in the 4-position by a hydrocarbon residue as already defined and converting the monoazo compound so-obtained into its sulphuric ester.

The conversion of the monoazo compounds referred to above into their sulphuric esters may be by treatment with sulphuric acid or other suitable known agents (see for example, Die Methoden der Organischen Chemie, Houben, 1925, vol. 2, p. 673).

The new dyestuffs, in the form of their ammonium or alkali metal salts, are soluble in water and have very good affinity for acetate artificial silk, dyeing that material from a slightly acid, neutral or slightly alkaline dyebath in non-phototropic yellow shades which have good fastness to light and are dischargeable. They are also very suitable for printing acetate artificial silk, yielding yellow prints of good light fastness and having a high resistance in respect of sublimation or "marking off," for example during steaming.

The new dyestuffs may also be used advantageously for colouring wool, silk, tin-weighted silk, and synthetic polyamide fibres such as, for example, nylon.

As diazo components there may be employed, for example:

p-Aminophenyl-β-hydroxyethyl ether sulphuric ester,
p-Aminophenyl-γ-hydroxypropyl ether sulphuric ester,
2 - chloro-4-aminophenyl-β-hydroxyethyl ether sulphuric ester,
4 - amino-2-methylphenyl-β-hydroxyethyl ether sulphuric ester,
γ-p-Aminophenoxy-n-butanol sulphuric ester,
4 - amino-3-methylphenyl-β-hydroxyethyl ether sulphuric ester, and
p-Aminophenyl-delta-hydroxybutyl ether sulphuric ester The above diazo components are obtainable by treating with sulphuric acid the corresponding aminophenyl-hydroxyalkyl ethers, which latter may also be used as diazo components according to the present invention.

As coupling components which may be employed according to the invention we mention:

p-Ethylphenol
p-n-Propylphenol
p-n-Butylphenol
p-Tert.-butylphenol
p-Tert.-amylphenol
p-n-Hexylphenol
p-Cyclohexylphenol
p-Hydroxydiphenyl, and
p-Benzylphenol The invention is illustrated, but not limited, by the following examples in which the parts are by weight.

Example 1

23.3 parts of p-aminophenyl-β-hydroxyethyl ether sulphuric ester are suspended in 300 parts of water containing 25 parts of 36% hydrochloric acid and diazotized at 7° C. by the addition of 7 parts of sodium nitrite. 15 parts of p-n-butylphenol (obtained as described below) are dissolved in 400 parts of water containing 4 parts of sodium hydroxide. 30 parts of anhydrous sodium carbonate and 80 parts of sodium chloride are added to the solution. This solution is cooled to 7° C. and to it, whilst it is stirred, the above diazo solution is gradually added. When coupling is complete 40 parts more of sodium chloride are added. The precipitated dyestuff is filtered off and dried. This new dyestuff forms a dull reddish yellow powder which dissolves in warm water giving a reddish yellow solution and in concentrated sulphuric acid giving a brownish red solution.

The new dyestuff dyes acetate artificial silk in greenish yellow shades of very good fastness in respect of light and sublimation when applied from a neutral dyebath containing sodium chloride or sodium sulphate.

p-n-Butylphenol is obtained by the diazotisation of p-n-butylaniline followed by hydrolysis.

Example 2

23.3 parts of p-aminophenyl-β-hydroxyethyl ether sulphuric ester are diazotised as described in Example 1, and the diazo solution, cooled to 5°–10° C., added to a stirred suspension prepared by boiling 17.6 parts of p-cyclohexylphenol with 400 parts of water containing 4 parts of sodium hydroxide, cooling to 5°–10° C. and adding 30 parts of anhydrous sodium carbonate and 80 parts of sodium chloride. When coupling is complete the new dyestuff is filtered off, washed with 10% sodium chloride solution and dried. It forms a dull reddish yellow powder which dissolves in warm water to a reddish yellow solution and in concentrated sulphuric acid to a brownish red solution.

The new dyestuff dyes acetate artificial silk from a neutral bath containing sodium chloride or sodium sulphate in greenish yellow shades of very good fastness properties.

Example 3

23.3 parts of p-aminophenyl-β-hydroxyethyl ether sulphuric ester are diazotised as in Example 1 and coupled to 15 parts of p-tertiary-butylphenol by the method described in Example 2 in respect of p-cyclohexylphenol. The dyestuff so-obtained is filtered off, washed with 10% sodium chloride solution and dried.

It forms a yellow powder which dissolves in warm water to a reddish yellow solution and in concentrated sulphuric acid to a red-brown solution.

The new dyestuff dyes acetate artificial silk in greenish yellow shades of very good fastness in respect of light and sublimation when applied from a neutral or slightly alkaline dyebath containing sodium chloride or sodium sulphate. The dyeings are dischargeable.

Example 4

23.3 parts of p-aminophenyl-β-hydroxyethyl ether sulphuric ester are diazotised as described in Example 1 and the diazo solution, cooled to 5–10° C., added to a stirred suspension prepared by boiling p-hydroxydiphenyl with 400 parts of water containing 4 parts of sodium hydroxide, cooling to 5–10° C. and adding 30 parts of anhydrous sodium carbonate. After stirring the mixture until coupling is complete the dyestuff is filtered off, washed with a little water and dried at 40–50° C.

The new dyestuff forms a dull yellow powder which dissolves in warm water to an orange-yellow solution and in concentrated sulphuric acid to a dull scarlet solution.

The new dyestuff dyes acetate artificial silk from a neutral dyebath containing sodium chloride or sodium sulphate in greenish yellow shades, the dyeings having very good fastness to light and to sublimation, and good dischargeability.

Example 5

The p-aminophenyl-β-hydroxyethyl ether sulphuric ester employed in Example 4 is replaced by 24.7 parts of p-aminophenyl-γ-hydroxypropyl ether sulphuric ester. A dyestuff is obtained having similar properties of shade, fastness and dischargeability.

Example 6

23.3 parts of p-aminophenyl-β-hydroxyethyl ether sulphuric ester are diazotised as described in Example 1. The diazo solution is cooled to 5°–10° C. and added to a stirred solution (at 5–10° C.) of 18.4 parts of p-benzylphenol in 400 parts of water containing 4 parts of sodium hydroxide to which solution 30 parts of anhydrous sodium carbonate have been added. The mixture is stirred until coupling is complete, when the dyestuff is filtered off, washed with a little water and dried at 40°–50° C.

The new dyestuff forms a yellow powder which dissolves in warm water to a yellow solution and in concentrated sulphuric acid to a dull scarlet solution.

The new dyestuff dyes acetate artificial silk in greenish yellow, non-phototropic shades of very good fastness to light and sublimation and good dischargeability.

Example 7

24.7 parts of p-aminophenyl-γ-hydroxypropyl ether sulphuric ester are employed instead of the p-aminophenyl-β-hydroxyethyl ether sulphuric ester in Example 6. A dyestuff having similar properties is obtained.

Example 8

24.7 parts of 4-amino-2-methylphenyl-β-hydroxyethyl ether sulphuric ester are diazotised by the method of Example 1. The diazo solution is added at 5–10° C. to a stirred suspension prepared by boiling 17 parts of p-hydroxydiphenyl in 400 parts of water containing 4 parts of sodium hydroxide, cooling to 5–10° C. and adding 30 parts of anhydrous sodium carbonate. When coupling is complete the new dyestuff is filtered off, washed with a little cold water and dried at 40–50° C.

The new dyestuff forms a light yellowish brown powder which dissolves in warm water to a reddish yellow solution and in concentrated sulphuric acid to a brownish red solution. It dyes acetate artificial silk from a neutral dyebath containing Glauber's salt or sodium chloride in greenish yellow shades, the dyeings having very good fastness to light and sublimation.

If 18.4 parts of p-benzylphenol are used instead of the 17 parts of p-hydroxydiphenyl employed above a dyestuff is obtained which forms an orange-brown powder. It dyes acetate artificial silk in yellow shades of good fastness to light and sublimation and good dischargeability.

Example 9

26.75 parts of 2-chloro-4-aminophenyl-β-hydroxyethyl ether sulphuric ester are dissolved in 400 parts of water containing 4 parts of sodium hydroxide. 35 parts of 36% hydrochloric acid are added followed by 6.9 parts of sodium nitrite. The solution of the diazo is then cooled to 5°–10° C. and gradually added to a stirred and similarly cooled solution of 15 parts of p-n-butylphenol in aqueous sodium hydroxide, chloride and carbonate prepared as described in Example 1. When coupling is complete the dyestuff is filtered off, washed with a little cold water and dried at 40°–50° C.

The new dyestuff forms a dull greenish yellow powder which dissolves in warm water to a reddish yellow solution and in concentrated sulphuric acid to a dull scarlet solution. It dyes acetate artificial silk from a neutral dyebath containing sodium chloride or Glauber's salt in greenish yellow shades of good fastness to light and sublimation.

Example 10

24.7 parts of p-aminophenyl-γ-hydroxypropyl ether sulphuric ester are suspended in 300 parts of water containing 25 parts of 36% hydrochloric acid and diazotised at 5°–10° C. by the addition of 7 parts of sodium nitrite. The diazo solution is gradually added to a stirred solution at 5°–10° C. of 15 parts of p-n-butylphenol in 400 parts of water containing 4 parts of sodium hydroxide and 30 parts of anhydrous sodium carbonate. Stirring is continued until coupling is complete. The new dyestuff is then filtered off and dried at 40°–50° C. It dyes acetate artificial silk from a neutral dyebath containing sodium chloride or Glauber's salt in non-phototropic greenish yellow shades of very good light fastness.

Example 11

15.3 parts of p-aminophenyl-β-hydroxyethyl ether are dissolved in 400 parts of water and 25 parts of 36% hydrochloric acid. 6.9 parts of sodium nitrite are added.

The diazo solution is added at 5°–10° C. to a mixture prepared by stirring 13.6 parts of p-n-propylphenol with 400 parts of water and 4 parts of sodium hydroxide till solution occurs, adding 21 parts of anhydrous sodium carbonate and cooling to 5–10° C. When coupling is complete the precipitated monoazo compound is filtered off, washed with water and dried.

The dried monoazo compound is powdered and added gradually (during about 1 hour) with stirring to 136 parts of 90% sulphuric acid. Stirring is continued for 10–15 hours at 15°–30° C. The resulting solution is then poured into a mixture of 200 parts of ice and 200 parts of water. 40% sodium hydroxide is then added cautiously until the aqueous medium is faintly alkaline to red litmus, ice being added as required to keep the temperature below 20° C. The new sulphuric ester dyestuff, in the form of its sodium salt, is then filtered off, washed with a little water and dried at 40°–50° C.

The new dyestuff dyes acetate artificial silk from a neutral dyebath containing sodium chloride in greenish yellow shades of very good light fastness and good dischargeability.

Example 12

15.3 parts of p-aminophenyl-β-hydroxyethyl ether are diazotised as in Example 11. The diazo solution is added gradually to a cooled suspension prepared from 17 parts of p-hydroxydiphenyl as described in Example 4. Stirring is continued until coupling is complete. The precipitated monoazo compound is filtered off, washed with water, dried at 40–50° C. and powdered. It is then converted to the sodium salt of its hydroxyethyl sulphuric ester by the method described in Example 11.

The new sulphuric ester dyestuff appears to be identical with the dyestuff of Example 4 and dyes acetate artificial silk from a dyebath containing sodium chloride or Glauber's salt in similar shades of greenish yellow, the dyeings having similar fastness properties and dischargeability.

If the 15.3 parts of p-aminophenyl-β-hydroxyethyl ether employed above are replaced by 16.7 parts of p-aminophenyl-γ-hydroxypropyl ether a water-soluble dyestuff is obtained, believed identical with that of Example 5 which dyes acetate artificial silk in similar greenish yellow shades, the dyeings having similar fastness properties and dischargeability.

We claim:

1. A monoazo dye represented by the formula:

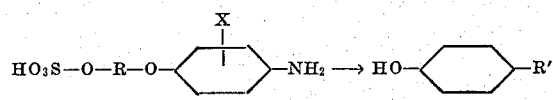

wherein HO₃S—O—R—O— is a hydroxyalkyl ether sulfuric ester group having 2 to 4 carbons in which the oxygens are attached to different carbons of the alkyl radical; X is one of the group consisting of hydrogen, methyl and chloro; and R' is one of the group consisting of butyl, cyclohexyl, phenyl and benzyl.

2. A dye in accordance with claim 1 in which R is ethylene.

3. A monoazo dye represented by the formula:

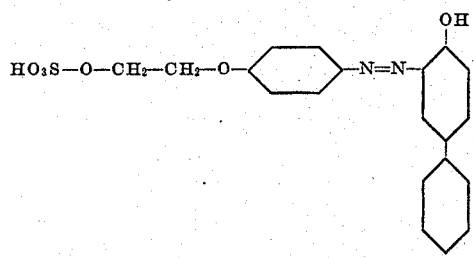

4. A monoazo dye represented by the formula:

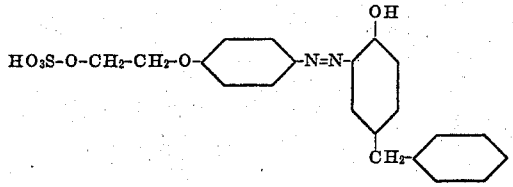

5. A monoazo dye represented by the formula:

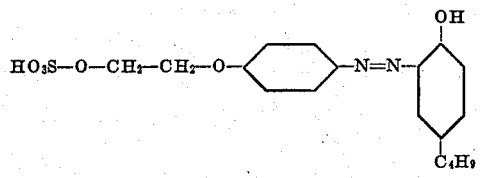

BASIL JASON HEYWOOD.
ARTHUR HOWARD KNIGHT.
MORVAN LAPWORTH.